US012475182B2

(12) United States Patent
Trivedi et al.

(10) Patent No.: US 12,475,182 B2
(45) Date of Patent: Nov. 18, 2025

(54) SYSTEM AND METHOD FOR CONTEXTUAL TASK AND IDEA GENERATION ACROSS MULTIPLE MODALITY INPUTS TO ENHANCE PRODUCTIVITY

(71) Applicant: Mitel Networks Corporation, Kanata (CA)

(72) Inventors: Rachit Trivedi, Karnataka (IN); Tejas Kanduri Aswathanarayana Murthy, Karnataka (IN)

(73) Assignee: MITEL NETWORKS CORPORATION, Kanata (CA)

( * ) Notice: Subject to any disclaimer, the term of this patent is extended or adjusted under 35 U.S.C. 154(b) by 0 days.

(21) Appl. No.: 18/379,593

(22) Filed: Oct. 12, 2023

(65) Prior Publication Data
US 2025/0124094 A1    Apr. 17, 2025

(51) Int. Cl.
*G06F 16/00*    (2019.01)
*G06F 16/9536*    (2019.01)
*G06F 40/20*    (2020.01)
*G06V 30/10*    (2022.01)

(52) U.S. Cl.
CPC .......... *G06F 16/9536* (2019.01); *G06F 40/20* (2020.01); *G06V 30/10* (2022.01)

(58) Field of Classification Search
None
See application file for complete search history.

(56) References Cited

U.S. PATENT DOCUMENTS

| | | | |
|---|---|---|---|
| 11,539,540 B1 | 12/2022 | Decrop et al. | |
| 11,755,829 B1* | 9/2023 | Naren | G06F 40/197 715/744 |
| 2012/0226676 A1* | 9/2012 | Kasterstein | G06F 16/9536 707/706 |
| 2017/0060407 A1* | 3/2017 | Kanbe | G06Q 10/101 |
| 2019/0073640 A1 | 3/2019 | Udezue et al. | |
| 2019/0313059 A1* | 10/2019 | Agarawala | G06F 3/011 |

(Continued)

FOREIGN PATENT DOCUMENTS

| | | |
|---|---|---|
| CA | 3158818 | 11/2022 |
| CN | 104115170 | 10/2014 |

OTHER PUBLICATIONS

BuckleyPlanet, "Productivity Tip: Create Tasks from Text within Outlook Email", retrieved from Internet on Oct. 17, 2023 at https://buckleyplanet.com/2022/11.

(Continued)

*Primary Examiner* — Hasanul Mobin

(57) ABSTRACT

An electronic method for contextual task creation during a screen sharing session includes collecting shared screen data, searching the shared screen data for a potential task, and confirming the potential task with a user to generate a confirmed task. The electronic method can further include sending the confirmed task to a task management engine where the task can be collaboratively reviewed for progress and accuracy. The electronic method can be performed by a contextual task creation program or system that utilizes optical character recognition techniques for converting an image of text into a machine-readable text format, and natural language processing techniques for identifying keywords, entities, and actionable items within the text to provide possible task suggestions to a user.

20 Claims, 10 Drawing Sheets

(56) References Cited

U.S. PATENT DOCUMENTS

| | | | | |
|---|---|---|---|---|
| 2019/0378611 | A1* | 12/2019 | Kim | G06Q 50/10 |
| 2021/0056860 | A1* | 2/2021 | Fahrendorff | G06Q 10/10 |
| 2021/0297527 | A1* | 9/2021 | Nitidharmatut | H04M 3/247 |
| 2021/0374391 | A1* | 12/2021 | Jorasch | G06V 40/19 |
| 2021/0392008 | A1* | 12/2021 | Lin | H04L 12/1818 |
| 2022/0277435 | A1* | 9/2022 | Muthusamy | G06F 3/1454 |
| 2022/0365984 | A1* | 11/2022 | Faulkner | G06N 20/00 |
| 2022/0394126 | A1* | 12/2022 | Nitidharmatut | H04M 15/8033 |
| 2023/0179742 | A1* | 6/2023 | Doken | H04N 7/15 |
| | | | | 348/14.08 |
| 2023/0283495 | A1* | 9/2023 | Liu | G06V 30/10 |
| | | | | 709/204 |
| 2023/0394440 | A1* | 12/2023 | Marshall | G06Q 10/101 |
| 2024/0064108 | A1* | 2/2024 | Smith | H04N 7/147 |
| 2024/0177118 | A1* | 5/2024 | Chakraborty | G06Q 10/1095 |
| 2024/0179538 | A1* | 5/2024 | Chakraborty | G06N 20/00 |

OTHER PUBLICATIONS

Microsoft Support, "Create a task from a Teams message", retrieved from Internet on Oct. 17, 2023 at https://support.microsoft.com, Copyright 2023.

\* cited by examiner

SYSTEM AND METHOD FOR CONTEXTUAL TASK AND IDEA GENERATION ACROSS MULTIPLE MODALITY INPUTS TO ENHANCE PRODUCTIVITY

BACKGROUND

1. Field

This specification relates to data processing systems, and more particularly to methods, systems, and computer program products for managing a screen sharing session and/or a chat session involving a virtual environment.

2. Description of the Related Art

Existing solutions for project collaboration include post-meeting task assignment or verbal task assignment. These existing solutions generally do not facilitate real-time collaboration effectively. For example, participants of a virtual meeting traditionally rely on traditional manual notetaking during screen sharing sessions. Participants might jot down important points, action items, or tasks separately as (or after) they observe the shared content. Some users typically attempt to create tasks by copy-pasting text directly from the shared content into task management tools. This approach is time-consuming and might not be suitable for tasks related to images or non-textual content. After the collaborative session, participants typically review the shared content and manually create tasks based on the discussed topics. However, this method causes delays in task assignment, and details are forgotten by the time the tasks are created.

In today's fast-paced world, digital communication has become an integral part of our lives, with chat platforms serving as a primary mode of communication for both personal and professional purposes. While these chat applications offer convenience and real-time communication, they often lack robust task management features, leading to potential information overload and missed opportunities to follow up on important tasks and commitments. For example, users frequently engage in extensive conversations on chat platforms, discussing various topics, sharing ideas, and assigning tasks to one another. However, as the volume of chat messages increases, it becomes increasingly challenging to keep track of all the assigned tasks and commitments. Without a reliable and integrated task management system within the chat platform, tasks can easily slip through the cracks, causing frustration, missed deadlines, and lost opportunities. Accordingly, there is a lack of reminders for follow-up that could be helpful to the chat platform participants.

BRIEF DESCRIPTION OF THE DRAWINGS

The subject matter of the present disclosure is particularly pointed out and distinctly claimed in the concluding portion of this specification. A more complete understanding of the present disclosure, however, may best be obtained by referring to the detailed description and claims when considered in connection with the drawing figures, wherein like numerals denote like elements and wherein:

Figure 1:
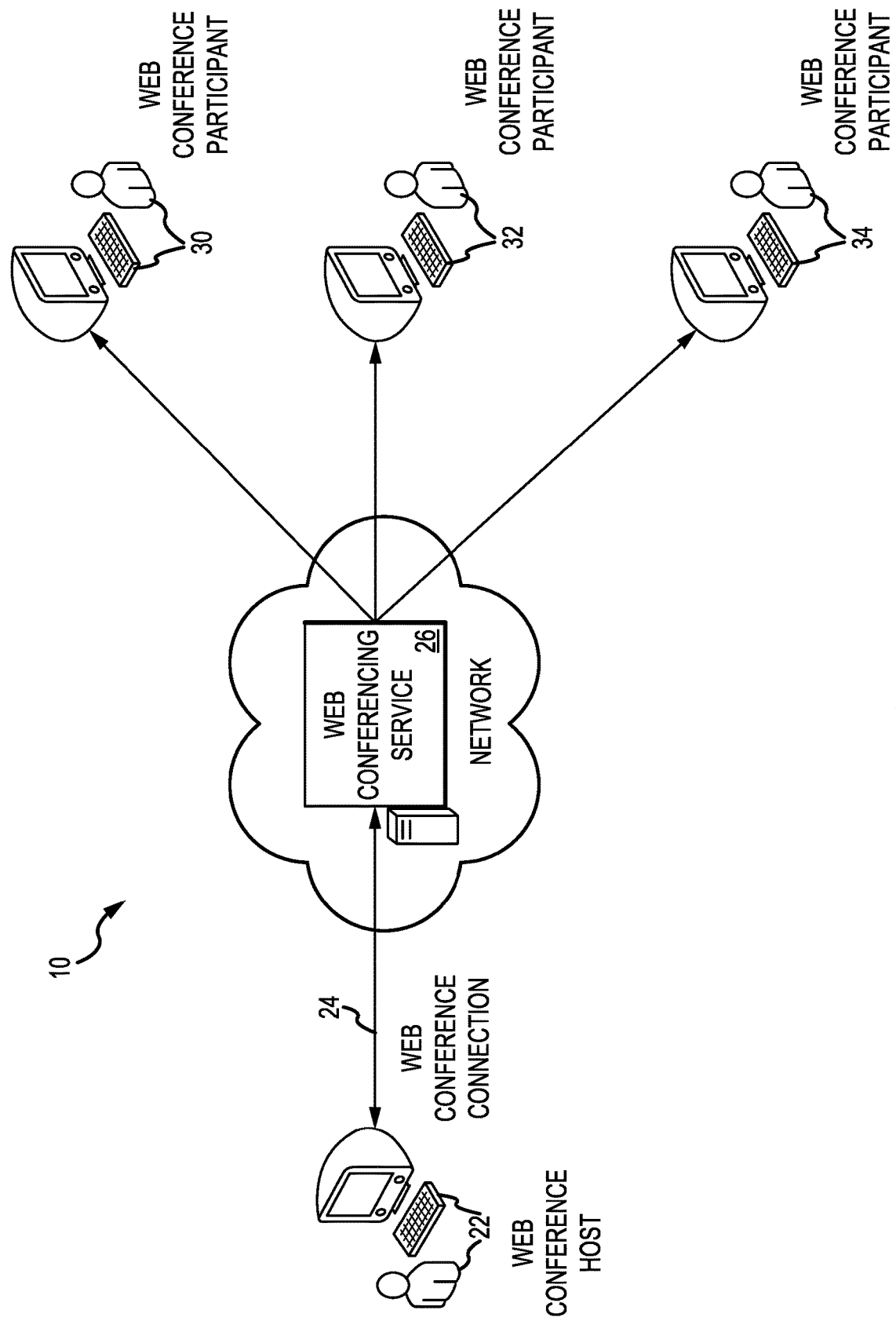
FIG. 1 is a block diagram illustrating a computer network environment in which a computing device executing a web conferencing application is used to establish a web conferencing session with a web conferencing service to allow the user interface of the computing device to be broadcast and shared with web conference participants according to aspects of this disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

As used herein, the terms application, module, analyzer, engine, and the like can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium is non-transitory and can also be, or be included in, one or more separate physical components or media (e.g., solid-state memory that forms part of a device, disks, or other storage devices).

As used herein, "engine" refers to a data-processing apparatus, such as a processor, configured to execute computer program instructions, encoded on computer storage medium, wherein the instructions control the operation of the engine. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices). In accordance with examples of the disclosure, a non-transient computer readable medium containing program can perform functions of one or more methods, modules, engines and/or other system components as described herein.

For purposes of the present disclosure, a "web conferencing service" is any computer-based service that allows two or more participants to communicate and/or exchange information, including audio, video, and graphical information, over a network. A web conferencing service allows information to be shared simultaneously, across geographically dispersed locations in real-time, or near real-time. As such, a web conferencing application allows for conducting meetings, training events, lectures, or short presentations from a computer. Communications and information exchanged between the participants in a web conferencing session may be broadcast to all participants, or in some cases, communications and information may flow in only one direction (e.g., from a host-participant to all other participants), such as the case might be with a web-based seminar (frequently referred to as a webinar). The present disclosure is applicable to any and all of the aforementioned web conferencing services, systems, and applications.

Screen sharing, which is a particular feature made possible by web conferencing services, allows a participant in a web conferencing session to share the user interface being displayed on the display of the participant's computing device. As such, a "screen sharing session" involves broadcasting a user interface displayed at a computing device to one or more other computing devices, thereby enabling remote web conferencing participants to view the user interface being presented on the display or screen of a computing device that is remote from the web conferencing participants. As described in greater detail below, with embodiments of the present disclosure a participant of a screen sharing session can generate contextual tasks for one or more web conference participants based upon shared screen content (e.g., pictures or text). Moreover, these tasks can be shared with other web-conference participants in real-time for additional real-time collaboration.

Existing solutions for project collaboration, such as post-meeting task assignment or verbal task assignment, do not facilitate real-time collaboration effectively. For example, participants of a virtual meeting traditionally relied on traditional manual notetaking during screen sharing sessions. They would jot down important points, action items, or tasks separately as (or after) they observed the shared content. Some users may have attempted to create tasks by copy-pasting text directly from the shared content into task management tools. This approach was time-consuming and might not have been suitable for tasks related to images or non-textual content. After the collaborative session, participants would review the shared content and manually create tasks based on the discussed topics. However, this method caused delays in task assignment, and details might have been forgotten by the time the tasks were created.

Contextual task generation systems and methods of the present disclosure allow participants to create tasks during the screen sharing session, fostering real-time collaboration, and ensuring that action items and tasks are assigned immediately as discussions take place. Aspects of the present disclosure provide a seamless integration within the screen sharing environment, allowing participants to create tasks effortlessly without switching between different tools or applications.

Aspects of the present disclosure seamlessly integrate Optical Character Recognition (OCR) and Natural Language Processing (NLP) techniques to enhance productivity during collaborative screen sharing sessions. Aspects of the present disclosure enables users to create tasks directly from shared content, whether it's an image or text, without relying on source files or chat messages. When a user shares their screen, participants gain the ability to instantly generate tasks linked to specific content in real-time, promoting seamless collaboration and enhanced productivity. Aspects of the present disclosure generate tasks that are contextually linked to the shared screen content. Accordingly, participants no longer manually interpret and transcribe information from the shared content, as tasks are created directly from the context being discussed. Aspects of the present disclosure ensure accurate task descriptions and eliminate the risk of misinterpretations. Aspects of the present disclosure foster real-time collaboration by allowing participants to create tasks during the screen sharing session. As discussions unfold, action items can be promptly identified and assigned, ensuring tasks are aligned with the evolving conversation and priorities.

Aspects of the present disclosure provide an intuitive and convenient way to create tasks from shared content. Participants can easily assign tasks to specific content pieces, ensuring accountability and clarity in task attribution.

Systems and methods of the present disclosure can include or be saved on a user's communication device (e.g., a cell phone, a tablet, a computer, etc.) as an application or program, where the application or program communicates with one or more other systems on the user's communication device through an application programming interface (API) or the like.

In general, one aspect of the subject matter described in this disclosure may be embodied in a communication system for contextual task creation. The communication system includes a data-collection engine configured to collect shared screen data, one or more searchable databases in communication with the data-collection engine and configured to store the shared screen data, and a search engine in communication with the one or more searchable databases and configured to (a) search the one or more searchable databases for a potential task, (b) confirm the potential task with a user to generate a confirmed task, and (c) store the confirmed task in a confirmed task database.

These and other embodiments may optionally include one or more of the following features. The data-collection engine can be configured to collect the shared screen data by capturing an image of the shared screen data. The shared screen data can include text. The shared screen data can be analysed by a data analyser in communication with the search engine for the potential task by using one or more of (a) optical character recognition (OCR) techniques for converting an image of text into a machine-readable text format, and (b) natural language processing (NLP) techniques for text communications. The potential task can include a deadline, an assignee, a recommended point of discussion based upon the shared screen data, a recommended topic based upon the shared screen data, a quote based upon the shared screen data, advice based upon the shared screen data, and/or a level of priority based upon sentiment analysis of the shared screen data. The communication system can further include a graphical user interface configured to (a) display the shared screen data, and (b) display a task creation option. The search engine can be further configured to receive user input via the task creation option. The confirmed task can be stored in the confirmed task database based upon the user input. The data-collection engine can be further configured to collect the shared screen data in response to the user selecting a portion of the graphical user interface that includes text for which task generation is desired. The data-collection engine can be further configured to collect the shared screen data in response to the user selecting the task creation option displayed on the graphical user interface. The search engine can be further configured to share, in real-time, the confirmed task with other users participating in a virtual meeting. The communication system can further include a virtual collaboration engine configured to display the shared screen data during a virtual meeting. The search engine can be further configured to send the confirmed task to a task management engine whereby the confirmed task is shared with other participants of a virtual meeting. The data-collection engine can be further configured to collect shared chat data that includes text. The search engine can be further configured to (a) generate a potential chat-based task with the user based upon the shared chat data to generate a confirmed chat-based task. (b) confirm a scheduled reminder time with the user, and (c) send a reminder of the confirmed chat-based task to the user at the scheduled reminder time.

In another aspect, the subject matter may be embodied in an electronic method for contextual task creation during screen sharing. The electronic method can include the step of using a data-collection engine, collecting shared screen data. The electronic method can further include the step of storing the shared screen data in one or more searchable databases in communication with the data-collection engine. The electronic method can further include the step of searching, utilizing a search engine in communication with the one or more searchable databases, the one or more searchable databases for a potential task. The electronic method can further include the step of confirming, utilizing the search engine, the potential task with a user to generate a confirmed task. The electronic method can further include the step of storing, utilizing the search engine, the confirmed task in a confirmed task database.

In another aspect, the subject matter may be embodied in an electronic method for contextual task creation during screen sharing, including the step of displaying, utilizing a virtual collaboration engine, a shared screen during a virtual meeting. The electronic method can further include the step of collecting, utilizing a data-collection engine, shared screen data that includes at least a portion of the shared screen. The electronic method can further include the step of searching, utilizing a search engine, the shared screen data for a potential task. The electronic method can further include the step of displaying, utilizing the search engine, the potential task on a graphical user interface to a user. The electronic method can further include the step of receiving, utilizing the search engine, user input from the user based upon the potential task displayed on the graphical user interface. The electronic method can further include the step of confirming, utilizing the search engine, the potential task with the user via the user input to generate a confirmed task. The electronic method can further include the step of displaying, utilizing the search engine, an indicator on the graphical user interface that the task has been confirmed. The electronic method can further include the step of storing, utilizing the search engine, the confirmed task in a confirmed task database.

Turning now to the figures, wherein the purpose is to describe embodiments of this disclosure and not to limit the scope of the claims, FIG. 1 is a block diagram illustrating a computer network environment 10 in which a computing device 22 executing a web conferencing application, consistent with an embodiment of the present disclosure, is used to establish a web conferencing connection (or session) 24 with a web conferencing service 26, and to direct the web conferencing service 26 to establish a web conferencing connection with web conference participants 30, 32, and 36, to thereby allow the user interface of the computing device 22 to be broadcast and shared with the web conference participants 30, 32, and 36. Although the computing device 22 being operated by the web conference host in the example of FIG. 1 is presented as a desktop computer, in other embodiments the client computing device of the web conference, as well as the computing devices of the web conference participants, might be any type of computer, having any number of form factors, to include desktop, laptop, and notebook computers, as well as a variety of other more application-specific devices, such as computing devices developed specifically for web/video conferencing, set top boxes and/or televisions with web/video conferencing functionality, mobile handsets or smart phones, and so forth.

For purposes of the example being presented in FIG. 1, one can presume that the web conference host using a web conferencing application executing on the computing device 22 desires to demonstrate, to the web conference participants 30, 32, and 34, a software application that is residing at the computing device 22. Accordingly, the web conference host invokes a web conferencing application residing on his or her computing device 22. Using the web conferencing application executing on the computing device 22, the web conference host initiates or invokes a web conferencing session and establishes a web conferencing connection 24 between the computing device 22 and the web conferencing service 26. This may involve sending out invitations (e.g., by email or other messaging service) to the web conference participants, or alternatively, simply invoking a command to initiate the web conferencing session, if the web conferencing session parameters (e.g., list of participants, scheduled time, and any additional resources) have already been defined.

After the web conferencing session has been initiated and each web conference participant 30, 32, and 34 has established a communication session with the web conferencing service 26 with his or her respective computing device, the participants will be able to exchange information with one another. For instance, with some embodiments, the web conferencing service may facilitate audible communication via any number of communication services and/or protocols that facilitate such communications over an Internet Protocol (IP) network, such as Voice Over IP (VOIP). With some embodiments, the web conferencing service 26 may integrate with a telephony server (not shown), enabling participants to use conventional landline telephones to establish an audible connection with the other participants. Accordingly, with some embodiments, the web conferencing service 26 may allow a mix of IP-based communications, and conventional analog telephone communications.

In addition to facilitating audible communications, the web conferencing service 26 may also facilitate the exchange of graphical or video information, for example, via one or more video-based communication protocols, to include, any one of the following: Real Time Messaging Protocol (RTMP), Real Time Media Flow Protocol (RTMFP), Real-time Transport Protocol (RTP), or Hypertext Transport Protocol (HTTP). Using one of the aforementioned protocols, and a video codec, such as H.264, one of the On2 TrueMotion codecs (e.g., VP6, VP7, VP8, or VPA), the Sorenson Spark video codec (also known as Sorenson H263 or FLV1), the vlib video codec, or some other similar video codec, a data stream received at the web conferencing service from one computing device may be broadcast to the computing devices of all web conference participants. With some embodiments, using a control interface of the web conferencing application, the web conference host may choose to share a user interface being presented at the computing device 22, or the user interface of a particular application executing at the computing device 22. In some embodiments, more granular control may enable a web conference host to specify a particular window; or other graphical user interface element of an application, that is to be broadcast to the other participants. Additionally, at least with some embodiments, the web conference host may authorize another web conference participant to share (e.g., broadcast) information being presented on his or her display screen.

If, during the web conferencing session, the web conference host desires to generate a task for one or more web conference participant based on the information being presented on his or her display screen, the web conference host can very easily manipulate a user input device (e.g., a mouse, a key board, etc.) to select the portion of the shared screen content whereby a contextual task generation application or system stored on the host's computing device 22 can be executed to generate a task that is shared with the other participants 30, 32, and 34 via the web conferencing service 26, as will be described in greater detail herein. Although having described a task being generated by the web conference host, a web conference participant 30, 32, and/or 34 may just as easily generate a task by selecting shared screen content on the web conference participant's screen. For instance, during the web conferencing session, the web conference host or a web conference participant 30, 32, and/or 34 may manipulate a user input device on the respective user's computing device to select or otherwise specify shared screen content for which task generation is desired. By pressing a button or interacting with some other graphical user interface element, the web conference host or participant causes the contextual task generation application or system to communicate a task over the network, with details corresponding to the shared screen content, to the other participants whereby tasks can be edited, confirmed, acknowledged, and/or discussed in real-time.

FIG. 1 illustrates a system 200 according to aspects of this disclosure. System 200 includes a data-collection engine 212 that collects shared screen content from one or more virtual collaboration engines 214, which can include any number of videoconferencing systems and software such as Zoom, Microsoft Team, MiTeam Meetings, Intermedia Unite and Any Meeting, Cisco Webex Meetings, ClickMeeting, Google Meet, Slack, Zoho Meeting, Click Meeting, and JoinM, among others. The virtual collaboration engine(s) 214 can display one or more of electronic text, images, and video across a plurality of user's screens during a virtual meeting. The virtual collaboration engine(s) 214 can cause one or more of electronic text, images, and video to be displayed on a user's screen, whereby the data-collection engine 212 can obtain the shared screen content. Accordingly, the data-collection engine 212 can collect the shared screen content locally from a graphical user interface, for example using a screen capture (i.e., saving an image of a user's display). In this regard, reference to the data-collection engine 212 collecting shared screen content from a virtual collaboration engine 214 can include capturing shared screen content on a local display. The shared screen content from the one or more virtual collaboration engines 214 can be obtained through image recognition and/or by text recognition, as described herein.

Data-collection engine 212 can store the shared screen content from the one or more virtual collaboration engines 214 into one or more databases 216 of shared screen content. The one or more databases 216 can each or respectively contain various types of shared screen content such as images and/or text. Stated differently, the shared screen content can be in the form of image or text.

Once the shared screen content is collected by data-collection engine 212, it is processed by a search engine 218 to extract potential task data. The search engine 218 can be configured to search each of the one or more databases 216 to analyze the shared screen content for potential tasks and store confirmed tasks in one or more confirmed task databases 220. The stored tasks can include various task data, including task details, assignee, task deadline, etc. The stored tasks can be in the form of text. Different confirmed tasks may be saved in different ones of confirmed task databases 220, for example based upon the task, the deadline, the assignee, the date of creation, etc.

Data analyzer 222 is in communication with, or includes, OCR 224 and NLP 226. The OCR 224 may be used to convert an image of text into a machine-readable text format. The NLP 226 may be used to analyze for text communications.

In various embodiments, the search engine 218 can extract potential task data from the shared screen content by comparing the shared screen content with known task language (e.g., images, text, etc.) stored in a task language database 228. For example, the task language database 228 can include key words or key phrases that indicate a certain task. In response to the search engine 218 determining that the shared screen content includes a key word or key phrase in the task language database 228, the search engine 218 can generate a task that corresponds with the key word or key phrase.

In various embodiments, the search engine 218 can send potential tasks and/or confirmed tasks to a task management engine 230. The task management engine 230) can be used to monitor the progress of the task. The task management engine 230 can be used to share the task with other participants, whereby the confirmed task can be collaboratively reviewed, edited, confirmed, etc. The task management engine 230) can send reminders to a user to remind the user of a task and/or an upcoming deadline. The task management engine 230 can include any number of task management systems and programs including Slack, Outlook, Microsoft Teams, etc.

Figure 2:
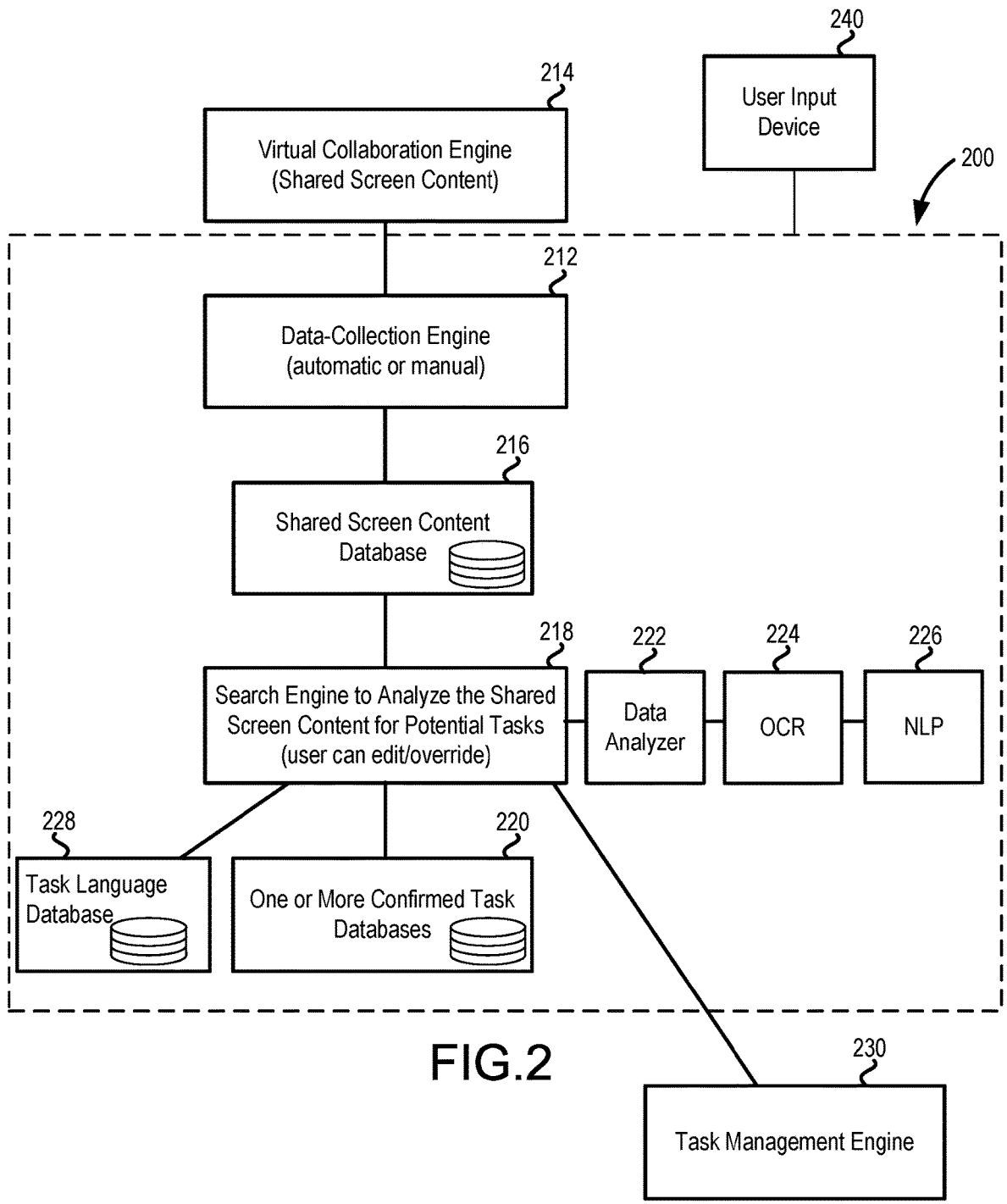
FIG. 2 is an exemplary contextual task creation system according to aspects of this disclosure.
Figure 3:
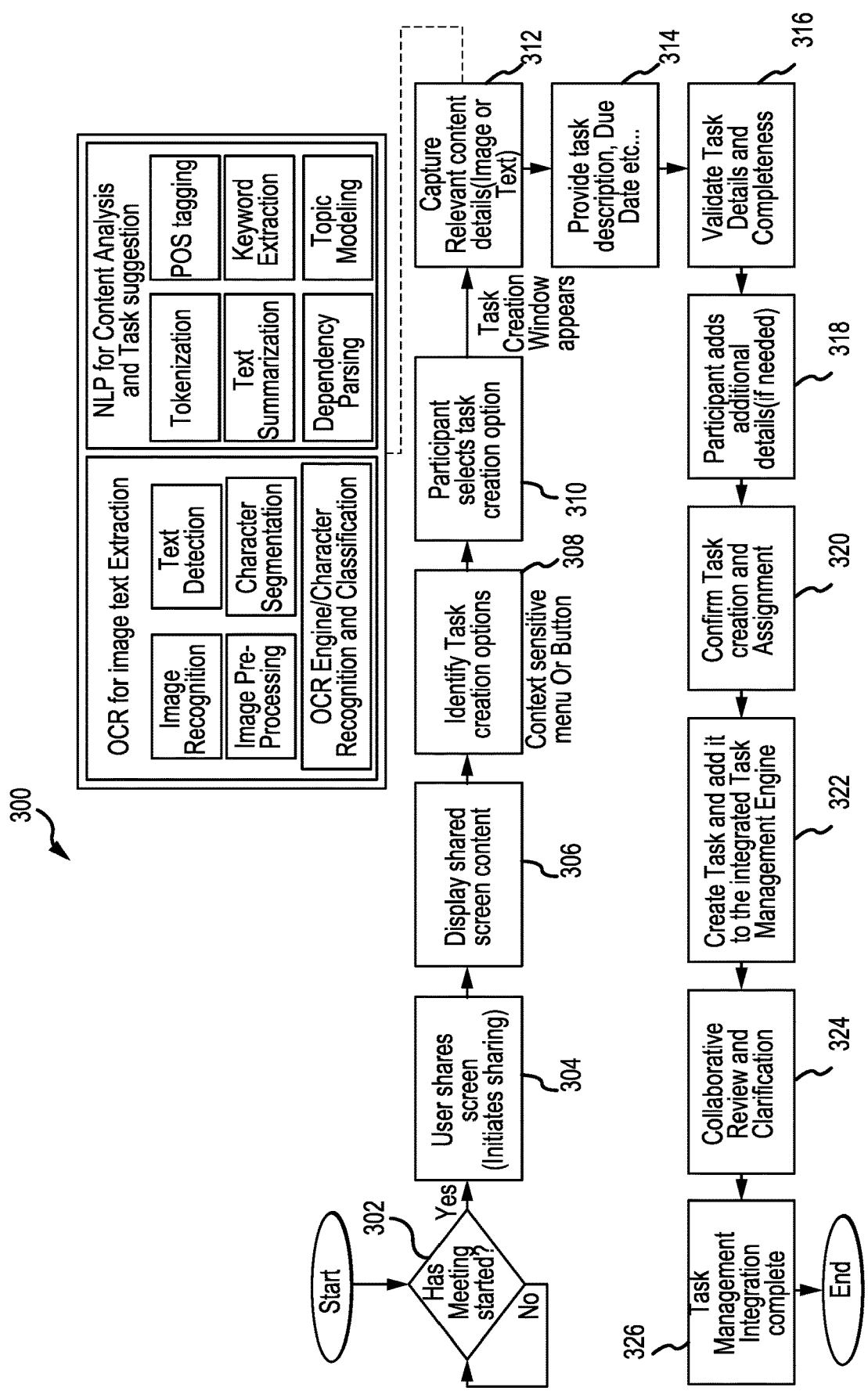
FIG. 3 illustrates a flow chart for an exemplary contextual task creation method according to aspects of this disclosure.

FIG. 3 illustrates a method 300 according to this disclosure. For ease of description, the method 300 is described below with reference to FIG. 1. The method 300 of the present disclosure, however, is not limited to use of the exemplary system 200 of FIG. 2.

The method can start at step 302 when a videoconference meeting has started. At step 304, a user shares their screen with other users participating on the videoconference meeting. The method 300 can begin by identifying a trigger event that initiates the task creation process. The trigger can be when a user shares their screen during a collaborative session (step 304).

At step 306, the shared screen content can be displayed on one or more user displays, such as a cellular device or a computer monitor for example. To enable participants to create tasks from shared content, an intuitive screen sharing interface can be utilized. The interface can allow seamless sharing of images and text between the user (screen sharer) and other participants.

At step 308, and in response to the user sharing their screen (step 304) and the shared screen content being displayed on a user's device (step 306), the data-collection engine 212 can identify task creation option based upon the shared screen content. For example, the data-collection engine 212 can generate and display on a graphical user interface a selectable context sensitive task menu or selectable task button. When a participant views the shared screen content, the screen sharing interface can recognize and highlight elements (e.g., images or text) that can be converted into tasks. A context-sensitive menu or task creation button can be provided to facilitate user input during task generation. Step 308 can occur automatically (i.e., without human intervention) or can occur manually (e.g., in response to a human selecting a task button on a graphical user interface).

At step 310, a user (i.e., a meeting participant) can select one or more task creation options indicating that task generation is desired for a particular shared screen content or a portion of the shared screen content. A user may enter commands and information into system 200 through an input device (e.g., user input device 240) such as a keyboard, a mouse, a pointing device, a graphics tablet, a touch screen, or any other suitable input device. In various embodiments, the system 200 can suggest one or more tasks for confirmation by the user based on user input via the selectable context sensitive task menu or selectable task button and the detected shared screen content (see FIG. 4 for example). In various embodiments, the system 200 can automatically suggest one or more tasks for confirmation by the user based on the detected shared screen content (see FIG. 5 for example). Step 310 can be omitted if task creation is being performed automatically.

At step 312, the system 200 can capture relevant content details (e.g., image and/or text) from the shared screen content to suggest a contextual task. In response to a user selecting the task creation option from the context-sensitive menu or button, a task creation window can pop up or appear. This window can capture pre-filled data from shared content, such as images or text. This window can also provide fields for task description, due date, and assignee selection. For example, the data analyzer 222 can use OCR 224 and/or NLP 226 to analyze the shared screen content for one or more potential tasks. The system uses OCR technology to identify and extract text from images that may be part of the shared content. After extracting text from the shared content, NLP will be leveraged to perform context analysis on the text data. NLP can identify keywords, entities, and actionable items within the text and provide possible suggestions to the user.

At step 314, the system 200 can provide (e.g., display via a graphical user interface and/or store in a database) the identified potential task to a user. The system 200 can provide the potential task including a task description, an assignee, and/or a due date, among other task details. Based on the extracted text and context analysis, the system 200 suggests task descriptions, due dates, and/or potential assignees to streamline task creation. NLP can also be utilized for sentiment analysis to understand the urgency or priority of the task.

In some embodiments, the potential task includes recommended ideas or discussion-points based upon the screen share content and/or chat content (referred to generally as messaging content). In some embodiments, the potential task includes identifying interesting themes or topics based upon the messaging content. In some embodiments, the potential task includes exemplary quotes or possible pieces of advice based on themes or topics in the messaging content. In some embodiments, the potential task includes sentiment analysis to determine the urgency of the priority order of certain tasks. For example, the NLP can be utilized for sentiment analysis to understand the urgency or priority of the task.

At step 316, the system 200 can validate task details and completeness with the user by providing (i.e., displaying on the graphical user interface) the task details to the user for review.

At step 318, the user can approve, deny, and/or edit the task details, if desirable, via the input device (e.g., input device 240).

At step 320, the system 200 can then confirm task creation and assignment. For example, the system 200 can display a confirmation to the user requesting approval to create the task. In this manner, the system 200 can inform other participants that a new task has been created from the shared content by visually indicating the task creation action on the screen sharing interface. Visual confirmation for informing the other participants can be in the form of a visual marker or icon next to the shared content element.

At step 322, the system 200 can create the confirmed task and add it to a visual management board, such as task management engine 230. For example, search engine 218 can store the confirmed task to the confirmed task database 220. The search engine 218 can send the confirmed task to the task management engine 230. As the participant creates the task, the system 200 can instantly add the task to the team's task management system or project board, ensuring real-time task visibility for all participants.

At step 324, users can collaboratively review and provide additional clarification (e.g., details, status, etc.) to the task to confirm that all users understand and agree on the task details. Accordingly, participants can discuss and review the newly created task using chat or commenting features in the collaboration platform. This allows for clarifications and additional context if desired. Step 324 can be performed utilizing the virtual collaboration engine (e.g., virtual collaboration engine 214).

The method can end at step 326. The method 300 ensures seamless integration with existing task management systems and collaboration platforms. The created tasks are automatically synchronized with the team's task management tools for efficient tracking and reporting.

Figure 4:
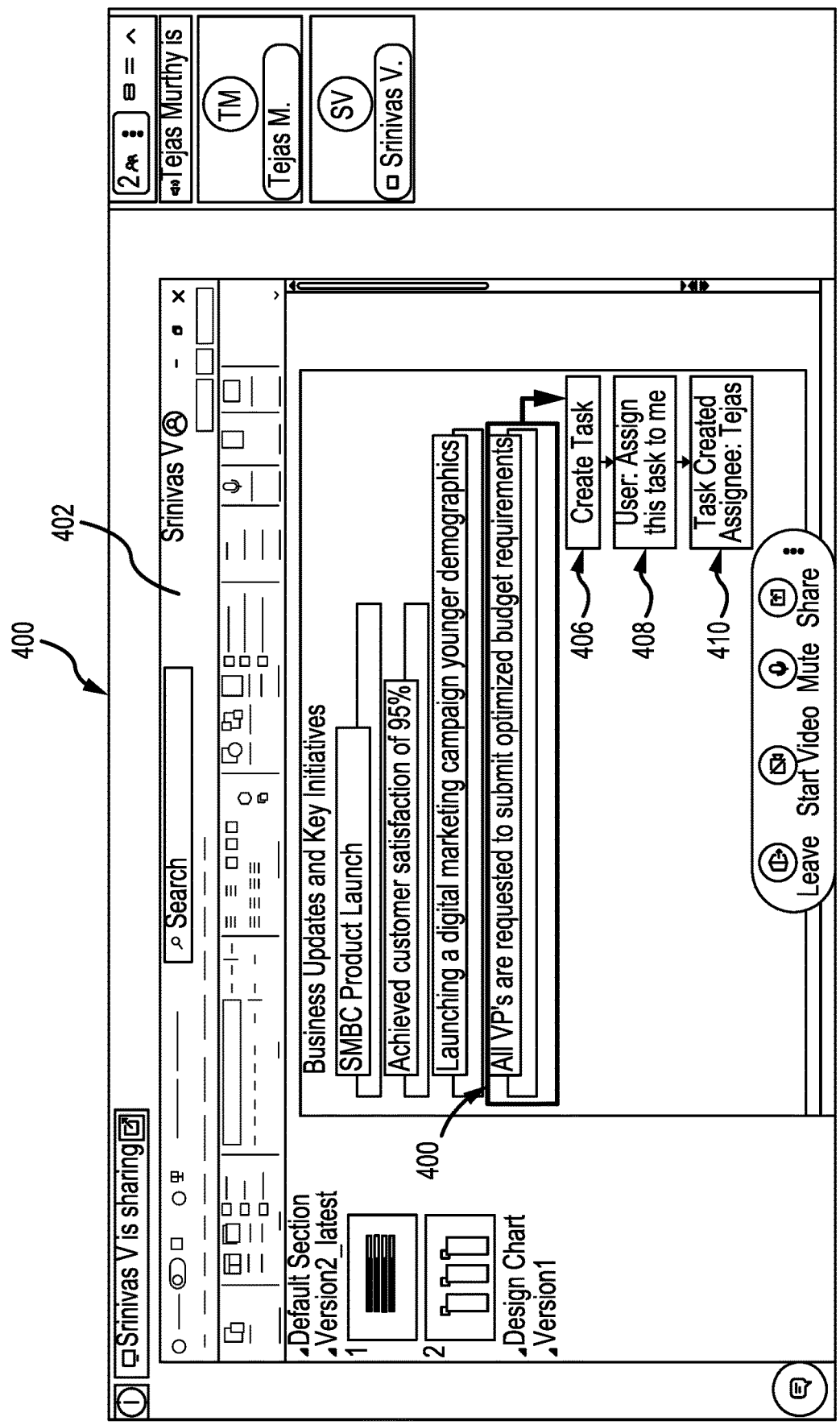
FIG. 4 illustrates an exemplary graphical user interface for a contextual task creation system according to aspects of this disclosure.

FIG. 4 illustrates an exemplary graphical user interface 400 for a contextual task generation system, such as system 200. The graphical user interface 400 shows shared screen content 402 from a virtual collaboration engine (e.g., virtual collaboration engine 214) whereby a host's or presenter's screen is being shared with a participant. The graphical user interface 400 further shows task creation options from data-collection engine 212 and/or search engine 218, which can be overlayed or incorporated in the virtual collaboration engine. In accordance with various embodiments, the data-collection engine 212 and/or search engine 218 can be implemented as a plug-in in communication with the virtual collaboration engine which provides the new task creation tools and functions described herein (e.g., to display task creation options, to allow a user to interact with the displayed content, to respond to the interaction by identifying potential or confirmed task details based on the shared screen content and/or user input, and to prompt and respond to initiation of a task creation event). A task creation event can occur when a host shares their screen. A task creation event can occur when a user selects a task creation option presented by the data-collection engine 212 and/or search engine 218 via the graphical user interface 400.

Graphical user interface 400 is configured to display shared screen content 402. Graphical user interface 400 is configured to display one or more task creation options or menus. For example, a user can highlight an area of the shared screen content 402 to choose content for which task creation is desired. The user can select a portion of the shared screen content 402 using a selection tool 404, such as a box or the like. With combined reference to FIG. 1 and FIG. 4, the selected portion of the shared screen content 402 can be saved by the data-collection engine 212 in the shared screen content database 216 as an image. The selected portion of the shared screen content 402 can include text. In response to the system 200 receiving the selected portion of the shared screen content 402, the data analyzer 222 can use OCR 224 and/or NLP 226 to analyze the shared screen content for one or more potential tasks. The system 200 can display one or more task creation options 406, 408 whereby the user can confirm the task creation and/or add additional task details and/or instructions. The system 200 can further display a task creation confirmation 410 to indicate that the task has been created. The confirmed task can then be saved in a database (e.g., task database 220)) and/or sent to a task management engine (e.g., task management engine 230)) for collaborative review and/or execution.

Figure 5:
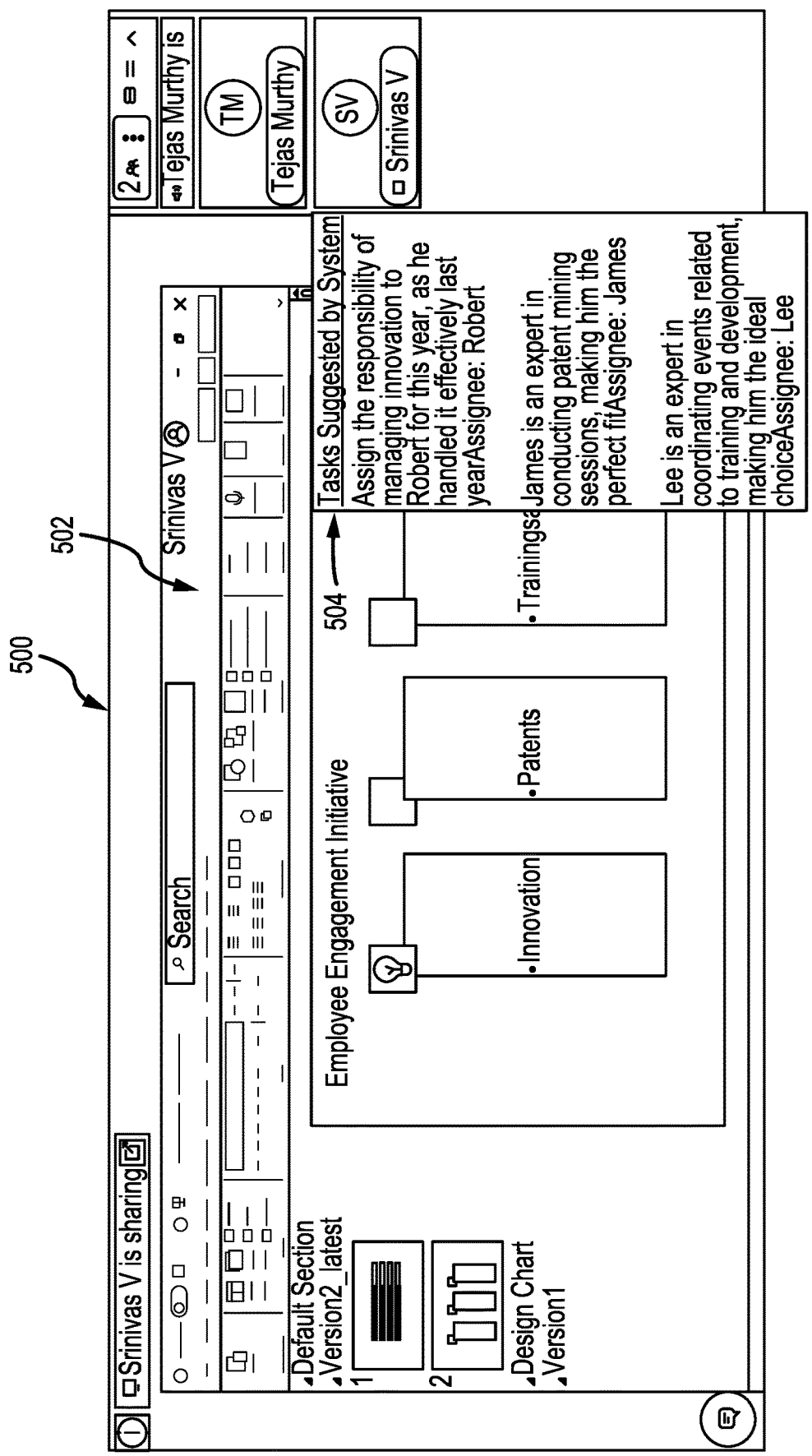
FIG. 5 illustrates an exemplary graphical user interface for a contextual task creation system according to aspects of this disclosure.

FIG. 5 illustrates an exemplary graphical user interface 500 for a contextual task generation system, such as system 200. The graphical user interface 500 shows shared screen content 502 from a virtual collaboration engine (e.g., virtual collaboration engine 214) whereby a host's or presenter's screen is being shared with a participant. The graphical user interface 500 further shows a menu 504 with suggested or potential tasks generated by data-collection engine 212 and/or search engine 218, which can be overlayed or incorporated in the shared screen content 502. In various embodiments, the task menu 504 can be automatically generated in response to the shared screen content 502 being shared with the user via the virtual collaboration engine. Accordingly, a task creation event can occur when a host shares their screen.

Graphical user interface 500 can be configured to display the shared screen content 502 and the task menu 504. With combined reference to FIG. 1 and FIG. 5, the shared screen content 502 can be saved by the data-collection engine 212 in the shared screen content database 216 as an image. The selected portion of the shared screen content 502 can include text. In response to the system 200 receiving the selected portion of the shared screen content 502, the data analyzer 222 can use OCR 224 and/or NLP 226 to analyze the shared screen content for one or more potential tasks. The system 200 can display one or more task creation options to display in the task menu 504 whereby the user can confirm the task creation and/or add additional task details and/or instructions. The confirmed task can then be saved in a database (e.g., task database 220) and/or sent to a task management engine (e.g., task management engine 230) collaborative review and/or execution.

Figure 6:
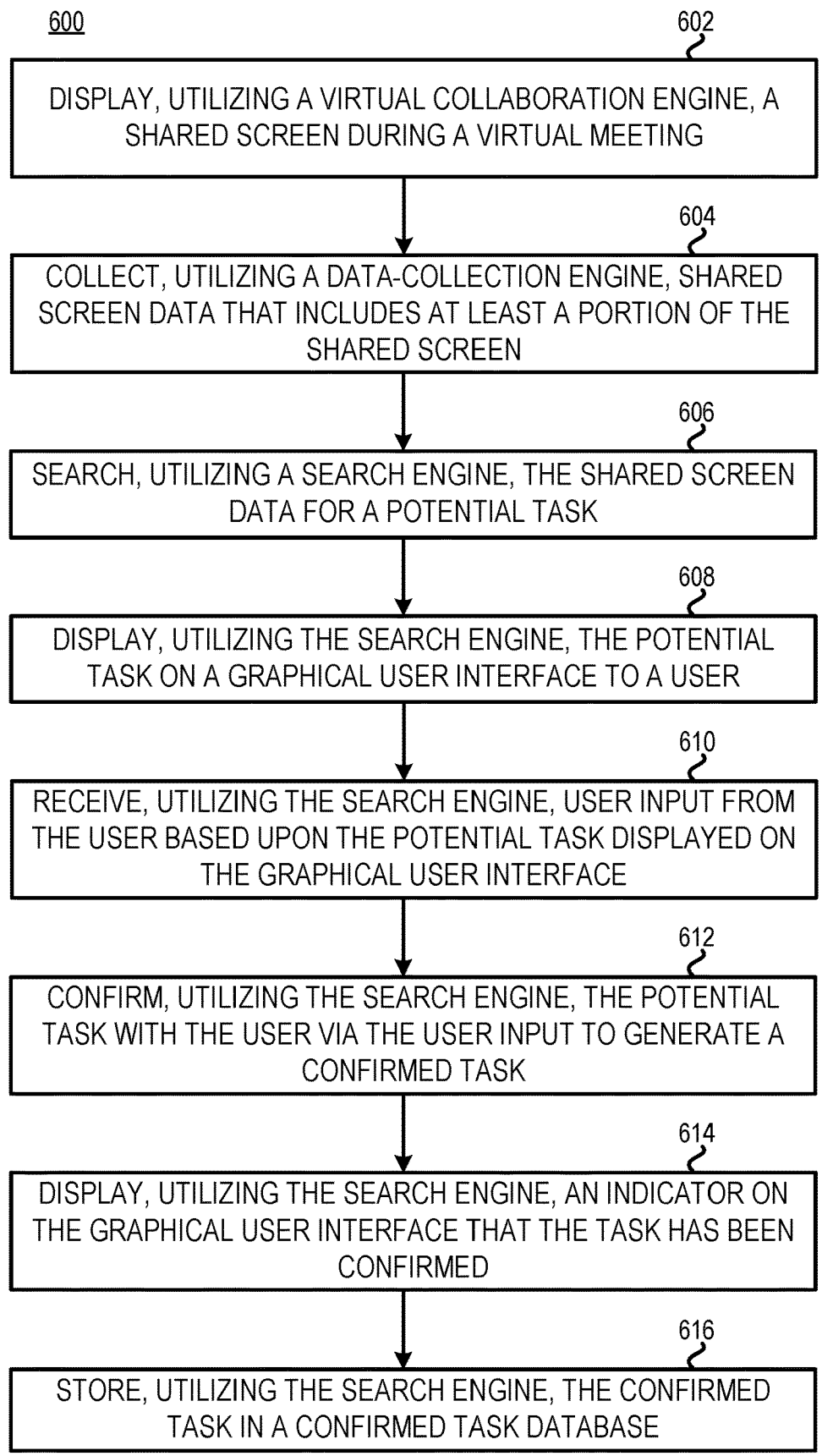
FIG. 6 illustrates an exemplary method for contextual task creation according to aspects of this disclosure.

FIG. 6 illustrates a method 600 according to this disclosure. For ease of description, the method 600 is described below with reference to FIG. 1 and FIG. 6. The method 600 of the present disclosure, however, is not limited to use of the exemplary system 200 of FIG. 1.

At step 602, the virtual collaboration engine 214 can display a shared screen during a virtual meeting.

At step 604, the data-collection engine 212 can collect shared screen data that includes at least a portion of the shared screen.

At step 606, the search engine 218 can search the shared screen data for a potential task.

At step 608, the search engine 218 can display the potential task on a graphical user interface (e.g., graphical user interface 400 of FIG. 4 or graphical user interface 500 of FIG. 5) to a user.

At step 610, the search engine 218 can receive user input from the user based upon the potential task displayed on the graphical user interface. For example, the user can review the potential task and accept, revise, or decline the potential task.

At step 612, the search engine 218 can confirm the potential task with the user via the user input to generate a confirmed task. For example, the search engine 218 can confirm the potential task based upon the user input indicating that the user has accepted and/or confirmed the task.

At step 614, the search engine 218 can display an indicator on the graphical user interface that the task has been confirmed. For example, the system 200 can display task creation confirmation 410 (see FIG. 4).

At step 616, the search engine 218 can store the confirmed task in a confirmed task database, such as confirmed task database 220.

Overall, the process of contextual task creation in real-time is useful for various fields where team collaboration is utilized. By allowing participants to create tasks during the screen sharing session, real-time collaboration is fostered, and action items and tasks can be assigned immediately as discussions take place.

Example Use Case

A team is using a collaboration platform that supports screen sharing and the idea of creating tasks from shared content. The team lead (user sharing the screen) initiates a virtual team meeting and shares their screen, displaying a project status dashboard that includes charts, graphs, and task lists related to the ongoing project. As the team members view the shared screen, they notice an upcoming deadline for a critical milestone and identify a potential risk associated with the project's progress. One of the team members, Robert, immediately recognizes the importance of addressing the risk and decides to create a task directly from the shared content. Robert hovers his mouse over the relevant chart that represents the potential risk. A context-sensitive menu appears, offering the option to "Create Task" from the chart.

Option 1: The system automatically identifies task opportunities and Robert chooses to select a task from the auto loaded options.
  Option 2: Alternatively, Robert can click on the "Create Task" option, and a task creation window opens-up, prefilled with relevant details from the chart (e.g., task description, project details, and due date). He adds further context to the task, describing the risk and action steps to mitigate it.

The system uses OCR technology to identify and extract text from images that may be part of the shared content. After extracting text from the shared content, NLP will be leveraged to perform context analysis on the text data. NLP can identify keywords, entities, and actionable items within the text and provide possible suggestions to the user. Based on the extracted text and context analysis, the system suggests task descriptions, due dates, and even potential assignees to streamline task creation. NLP can also be utilized for sentiment analysis to understand the urgency or priority of the task.

After completing the task details, Robert assigns the task to the team member best suited to handle the risk mitigation, selecting their name from a drop-down list of team members. Once the task is created and assigned, it is automatically added to the team's task management system or project board, maintaining a direct link to the shared content (chart) where it originated. The task creation action is visually indicated on the shared screen, allowing other team members to see that a new task has been created from the chart.

Possible Variations

There are several possible variations to the system and method described herein, depending on the specific needs and goals of the application. Some examples follow:
(1) Collaborative Voting on Task Priority. The system can allow participants to vote on the priority of tasks created from the shared content. This feature ensures that the most critical action items are identified and addressed first, based on a consensus among participants.
(2) Integration with machine learning. Machine learning algorithms could be incorporated to identify potential tasks in shared screen data that are not immediately apparent to human analysts. This could enable the system 200 to make more accurate predictions or recommendations based on the shared screen content.

Seamless Task Management and Reminder Follow-up in Chat

In today's fast-paced world, digital communication has become an integral part of human lives, with chat platforms serving as a primary mode of communication for both personal and professional purposes. While these chat applications offer convenience and real-time communication, they often lack robust task management features, leading to potential information overload and missed opportunities to follow up on important tasks and commitments. Users frequently engage in extensive conversations on chat platforms, discussing various topics, sharing ideas, and assigning tasks to one another, however, there is a lack of reminders for follow-up. However, as the volume of chat messages increases, it becomes increasingly challenging to keep track of all the assigned tasks and commitments. Without a reliable and integrated task management system within the chat platform, tasks can easily slip through the cracks, causing frustration, missed deadlines, and lost opportunities.

Over time, several solutions have been developed to address the challenge of task management in chat platforms. While not identical to the idea presented, these previous solutions attempted to improve task visibility and organization within chat applications:

Manual Task Tagging: One of the earliest approaches involved users manually tagging or flagging messages that contained tasks or action items. This method allowed users to mark specific chat messages as tasks and later search for those tags to review and follow up on assigned tasks. However, this approach heavily relied on users' diligence and could still lead to oversight if they forget to tag messages correctly.

External Task Management Integration: Some chat platforms offered integrations with third-party task management tools. Users could forward specific chat messages to these external tools, turning them into separate tasks with reminders. While this approach provided a more comprehensive task management system, it required users to switch between the chat platform and external tools.

Aspects of the present disclosure integrate a reminder follow-up directly within a chat window. When a task is detected, the system prompts the user to set a reminder without requiring them to switch to external tools or rely on chatbot commands. This seamless integration streamlines the task management process, making it more efficient and user-friendly. Moreover, the detected tasks reappear in the chat window as a reminder to both the parties. After setting a reminder for a task, the system displays the task with its due date and status in the ongoing chat conversation. This ensures that users have constant visibility of their tasks, eliminating the need to search through previous messages or rely on separate task lists.

Aspects of the present disclosure provide task management within chat. Reminders are generated by making messages reappear at specified intervals. Through NLP algorithms, the system can detect tasks and action items in real-time as they are discussed in chat conversations. By seamlessly integrating reminders directly within the chat window, the system ensures that no task is overlooked or forgotten. This results in an efficient and centralized task tracking experience for users. By providing real-time task detection, integrated reminders, and centralized task tracking, aspects of the present disclosure boost productivity, collaboration, and task accountability.

Figure 7:
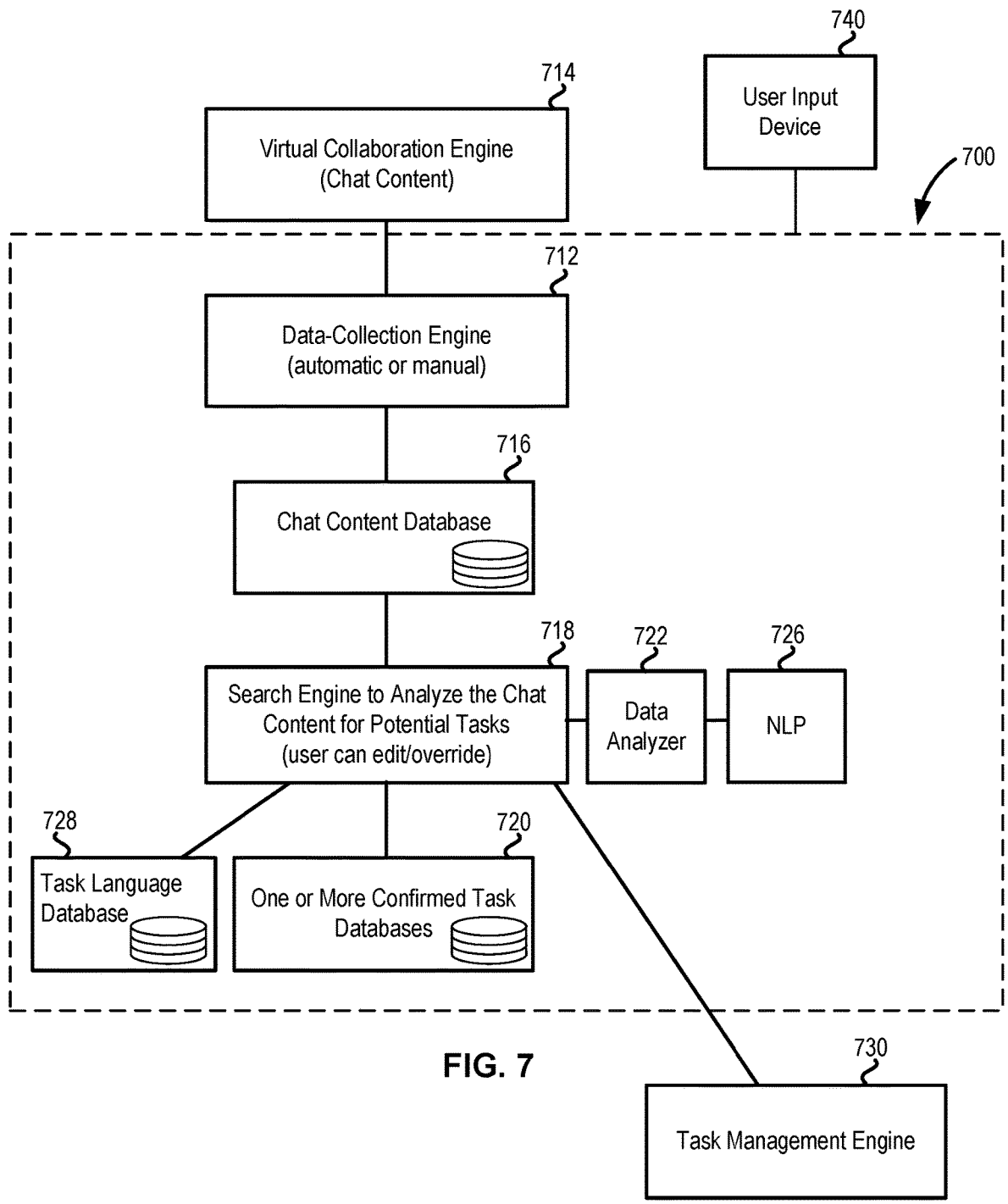
FIG. 7 is an exemplary contextual chat-based task creation system according to aspects of this disclosure.

FIG. 7 illustrates a system 700 according to aspects of this disclosure. System 700 includes a data-collection engine 712 that collects chat content from one or more virtual collaboration engines 714, which can include any number of videoconferencing and/or chat communication systems and software such as Zoom, Microsoft Team, MiTeam Meetings, Intermedia Unite and Any Meeting, Cisco Webex Meetings, ClickMeeting, Google Meet, Slack, Zoho Meeting, Click Meeting, and JoinM, among others. The virtual collaboration engine(s) 714 can display one or more of electronic text, images, and video across a plurality of user's screens during a virtual meeting. The virtual collaboration engine(s) 714 can cause one or more of electronic text, images, and video to be displayed on a user's screen, whereby the data-collection engine 712 can obtain the chat content. The virtual collaboration engine(s) 714 can be a chat engine without videoconferencing capability. Stated differently, the system 700 can be directed to a chat communication application. Accordingly, the data-collection engine 712 can collect the chat content locally from a participant's graphical user interface and/or local computer. The chat content can be in the form of text. In this regard, reference to the data-collection engine 712 collecting chat content from a virtual collaboration engine 714 can include collecting chat content being displayed on a local display. The chat content from the one or more virtual collaboration engines 714 can be obtained through text recognition, as described herein.

Data-collection engine 712 can store the chat content from the one or more virtual collaboration engines 714 into a chat content database 716. The database 716 can contain chat content such as text.

Once the chat content is collected by data-collection engine 712, it is processed by a search engine 718 to extract potential task data. The search engine 718 can be configured to search each of the database 716 to analyze the chat content for potential tasks and store confirmed tasks in one or more confirmed task databases 720. The stored tasks can include various task data, including task details, assignee, task deadline, etc. The stored tasks can be in the form of text. Different confirmed tasks may be saved in different ones of confirmed task databases 720, for example based upon the task, the deadline, the assignee, the date of creation, etc.

Data analyzer 722 is in communication with, or includes NLP 726. The NLP 726 may be used to analyze for text communications.

In various embodiments, the search engine 718 can extract potential task data from the chat content by comparing the chat content with known task language stored in a task language database 728. For example, the task language database 728 can include key words or key phrases that indicate a certain task. In response to the search engine 718 determining that the chat content includes a key word or key phrase in the task language database 728, the search engine 718 can generate a task that corresponds with the key word or key phrase.

In various embodiments, the search engine 718 can send potential tasks and/or confirmed tasks to a task management engine 730. The task management engine 730) can be used to monitor the progress of the task. The task management engine 730) can be used to share the task with other participants, whereby the confirmed task can be collaboratively reviewed, edited, confirmed, etc. The task management engine 730) can send reminders to a user to remind the user of a task and/or an upcoming deadline. The task management engine 730 can include any number of task management systems and programs including Slack, Outlook, Microsoft Teams, etc.

Figure 8:
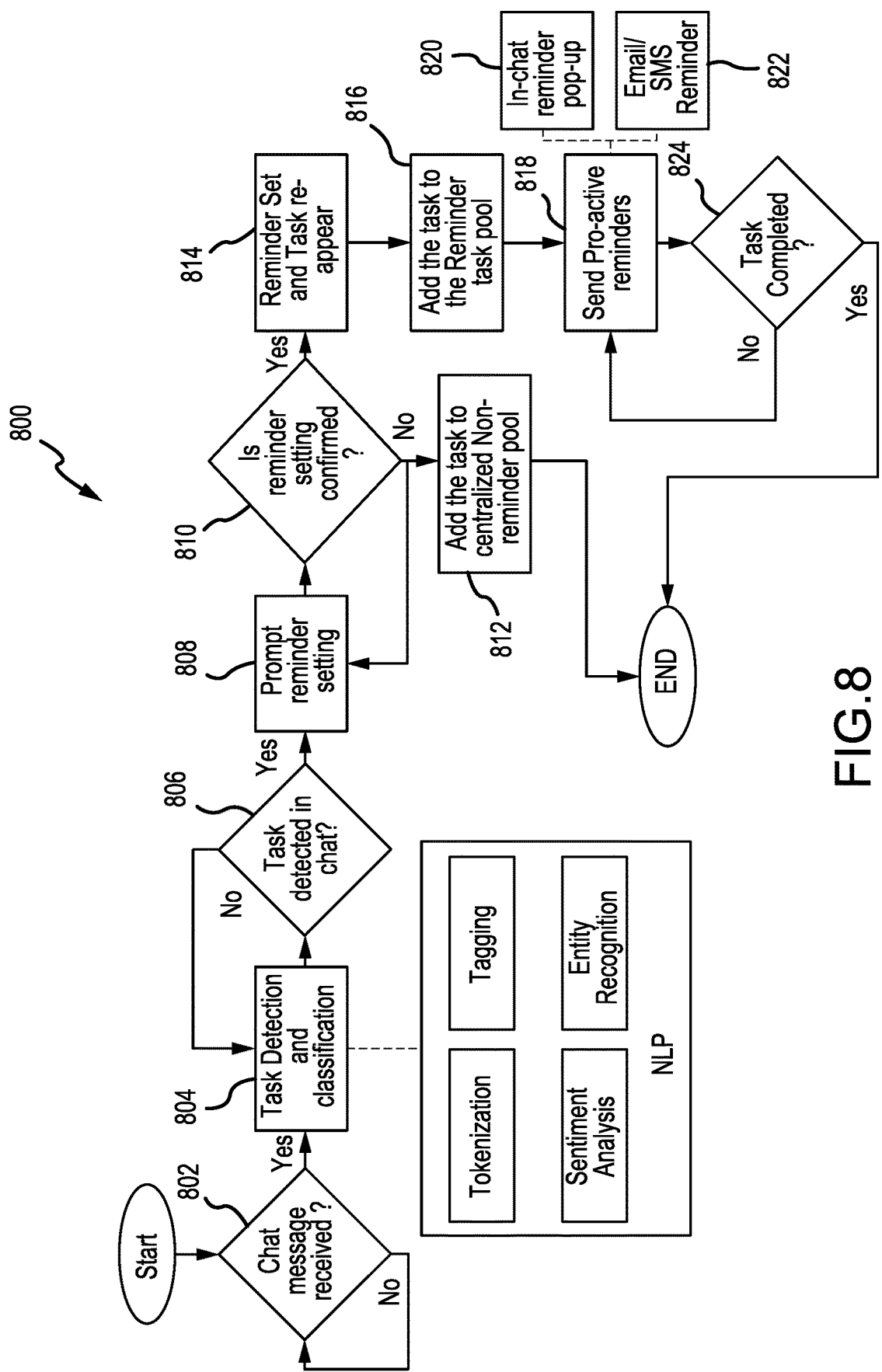
FIG. 8 illustrates a flow chart for an exemplary chat-based contextual task creation method according to aspects of this disclosure.

FIG. 8 illustrates a method 800 according to this disclosure. For ease of description, the method 800 is described below with reference to FIG. 7. The method 800 of the present disclosure, however, is not limited to use of the exemplary system 700 of FIG. 7.

A chat participant can use their preferred chat tool (e.g. virtual collaboration engine 714), for example Slack, Google chat, Discord, Skype etc. The system 700 can automatically detect real-time tasks and integrate reminders without requiring manual intervention for individual and group notifications. At step 802, the system 700 (e.g., a chat monitoring module) can continuously observe chat conversations in real-time within the chat platform. At step 804, the system 700 can collect and analyze messages as they are sent and received by users. For example, the search engine 718 can utilize advanced NLP algorithms (e.g., NLP 726) and machine learning models to process the chat messages. The NLP analysis can focus on identifying task-related patterns and keywords, such as "to-do," "action item," "deadline," or phrases containing verbs suggesting tasks. These keywords can be saved in task language database 728. At step 806, using the NLP analysis, the system 700 can determine whether a particular chat message contains a task or action item. The system 700 can classify the identified tasks based on their attributes, such as task description, due date, and assigned person.

In some embodiments, the potential task includes recommended ideas or discussion-points based upon the chat content (referred to generally as messaging content). In some embodiments, the potential task includes identifying interesting themes or topics based upon the messaging content. In some embodiments, the potential task includes exemplary quotes or possible pieces of advice based on themes or topics in the messaging content. In some embodiments, the potential task includes sentiment analysis to determine the urgency of the priority order of certain tasks. For example, the NLP can be utilized for sentiment analysis to understand the urgency or priority of the task.

At step 808, for each detected task, the system 700 can generate a reminder prompt that appears within the chat window. The prompt can include options for setting reminders, such as due date and notification preferences. At step 810 a user can confirm the reminder setting, for example using user input device 740. At step 812, in response to the user failing to confirm the reminder setting, the task can be added to a centralized non-reminder pool or database. At step 814, in response to the user confirming the reminder setting (i.e., the user sets the reminder), the detected task will reappear in the chat window, displaying its description, due date, and status indicators.

At step 816, the system 700 maintains a centralized task list for each user, storing all assigned and received tasks from different chat conversations. The task list can be easily accessible for the user to review and manage all their tasks in one place.

At step 818, the system 700 enable seamless task sharing and delegation among individuals or groups within the chat platform. Users can have the ability to assign tasks to others and monitor task progress collaboratively. The system 700 can send in-chat reminder pop-ups (step 820). The system 700 can send email/sms reminders (step 822).

At step 824, the system 700 allow users to mark tasks as "completed" when finished. The system 700 can update the task status in real-time and display a visual indicator of completed tasks within the chat window.

In various embodiments, reminders can be set manually. This manual method involves re-displaying a chat message in the chat window as a follow-up or reminder for a user. This can be useful for reminding users about certain tasks or topics that they need to address. When a user sends a message where a follow-up or reminder is desired, the system 700 can associate that message with a specific date and time when the reminder should appear again. The system 700 can store the chat messages along with their scheduled reminder times in a database (e.g., task databased 720). The system 700 periodically checks the database for messages that are due for reminders. When the scheduled time for a reminder arrives, the system 700 shows the corresponding message in the user's chat window. The reminder could be real-time updates (e.g., WebSockets) or a polling mechanism to notify the user that a reminder is available. The system 700 can provide the user with options to interact with the reminder. The system 700 can prompt the user to mark the task as completed, snooze it for a later time, or dismiss it. When the user interacts with a reminder (completes, snoozes, dismisses), the system 700 can update the status of the reminder in the database. Accordingly, the system 700 can be configured to (a) generate a potential chat-based task with the user based upon the shared chat data to generate a confirmed chat-based task, (b) confirm or schedule a reminder time with the user, and (c) send a reminder of the confirmed chat-based task to the user at the scheduled reminder time.

Figure 9:
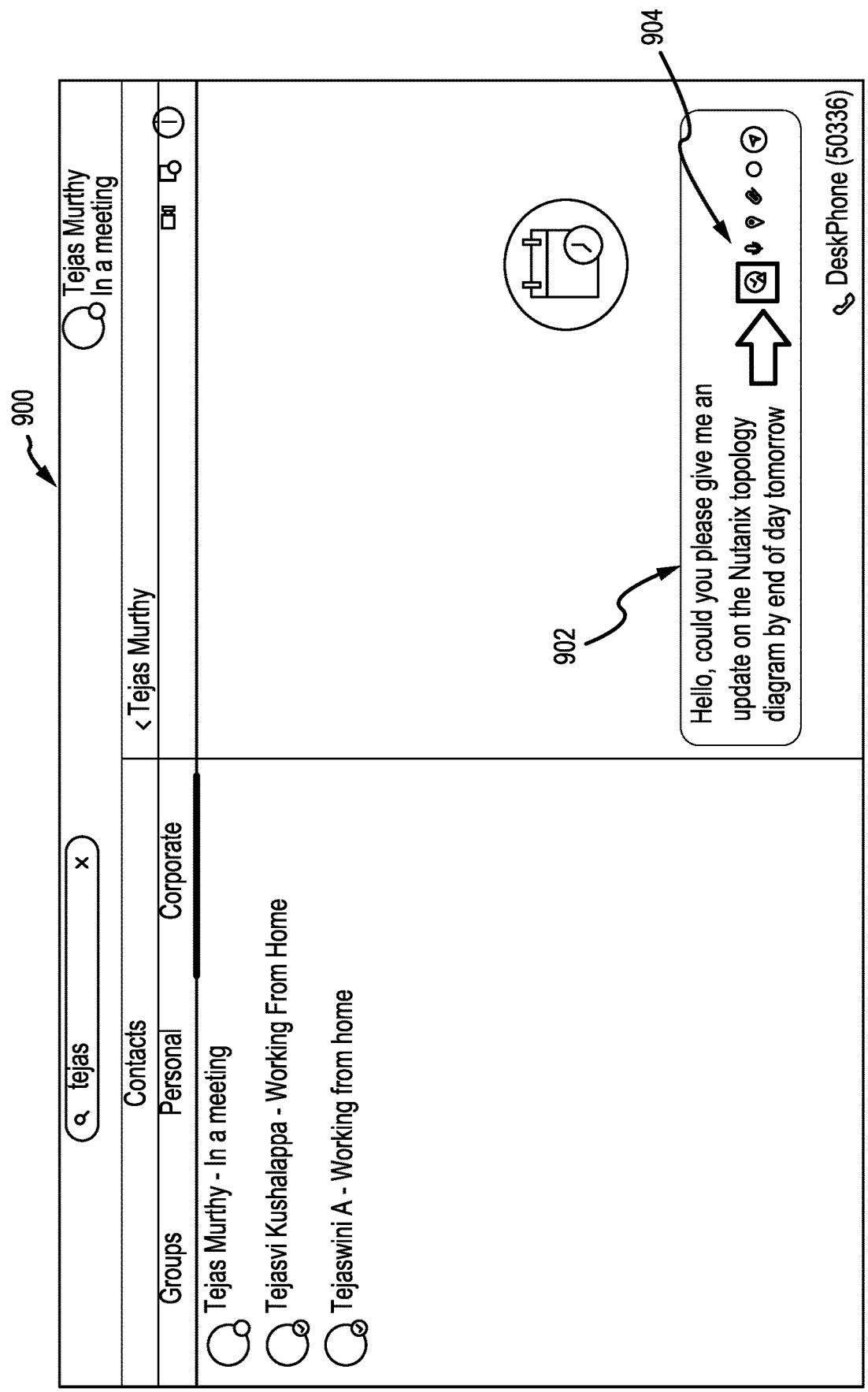
FIG. 9 illustrates an exemplary graphical user interface for a contextual chat-based task creation system according to aspects of this disclosure.

FIG. 9 illustrates an exemplary graphical user interface 900 for a contextual task generation system, such as system 700. The graphical user interface 900 shows shared chat content 902 from a virtual collaboration engine (e.g., virtual collaboration engine 714) whereby two or more participants can share chat message. The graphical user interface 900 further shows task creation options from system 700, which can be overlayed or incorporated in the virtual collaboration engine. In accordance with various embodiments, the system 700 can be implemented as a plug-in in communication with the virtual collaboration engine which provides the new task creation tools and functions described herein (e.g., to display task creation options, to allow a user to interact with the displayed content, to respond to the interaction by identifying potential or confirmed task details based on the shared screen content and/or user input, and to prompt and respond to initiation of a task creation event). In response to a user receiving a text message, a task creation menu or button 904 can be displayed and selected by the user to create a reminder for a new received message. For example, the task creation button 904 can cause a reminder to be generated based upon the chat content (e.g., task: Nutanix topology diagram update, due: COB tomorrow; assignee: R. Trivedi, etc.). The system 700 can be configured to send smart reminders to one or more users of the upcoming deadline at configurable intervals as the deadline approaches.

Figure 10:
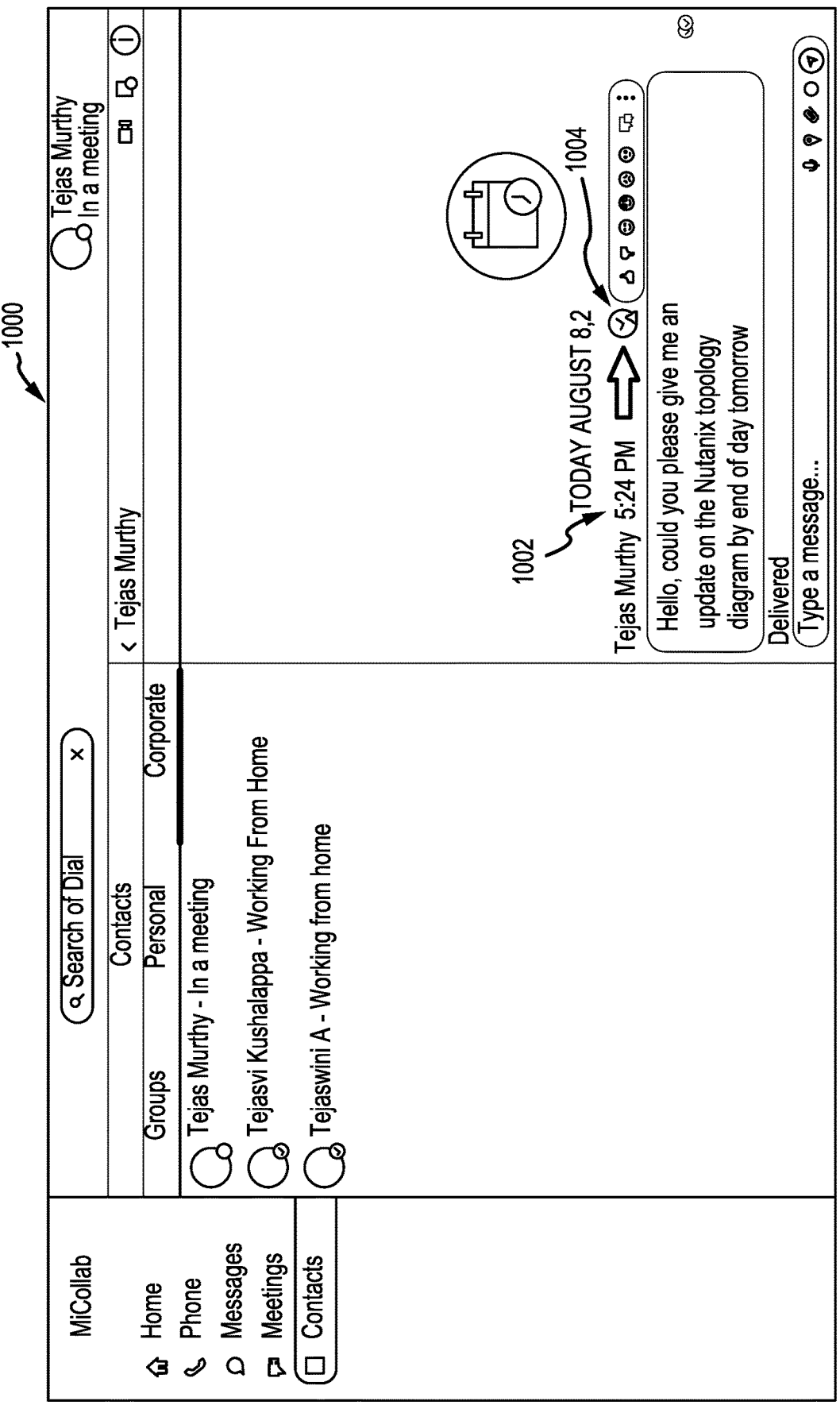
FIG. 10 illustrates an exemplary graphical user interface for a contextual chat-based task creation system according to aspects of this disclosure.

FIG. 10 illustrates an exemplary graphical user interface 1000 for a contextual task generation system, such as system 700. In response to a user sending a text message 1002, a task creation menu or button 1004 can be displayed and selected by the user to create a reminder for sent messages. Accordingly, tasks can be generated for both sent (FIG. 10) and received (FIG. 9) messages.

Example Use Case

Robert is a busy marketing manager who coordinates various campaigns and works closely with his team. He communicates with team members through a chat platform and frequently assigns tasks and action items during these discussions.

Robert wants an efficient way to manage tasks within the chat platform, ensuring that no tasks are overlooked or forgotten. He desires a streamlined process that allows him to set reminders for follow-up without switching to external tools or relying on his memory.

With aspects of the present disclosure in place, Robert efficiently manages tasks within the chat platform. Real-time detection and reminder follow-up ensures that no tasks are forgotten or overlooked. Robert benefits from the seamless integration of task reminders within the chat window, eliminating the need to switch to external tools or set reminders manually. The centralized task list helps Robert stay organized and have a clear overview of his tasks across various chat conversations. The smart reminders provided by aspects of the present disclosure ensure that Robert never misses a task deadline, promoting better task completion and overall productivity in his marketing campaigns.

Possible Variations

There are several possible variations to the system and method described herein, depending on the specific needs and goals of the application. Some examples follow:
(1) AI driven smart reminders. The reminder system can use AI-driven "smart" reminders. The AI could analyze users' task patterns, work habits, and historical data to provide proactive and context-aware reminders.
(2) Collaborative Task sharing. Enable users to share tasks not only with individuals but also with groups or entire teams.

The description of embodiments provided herein is merely exemplary and is intended for purposes of illustration only; the following description is not intended to limit the scope of the claims. Moreover, recitation of multiple embodiments having stated features is not intended to exclude other embodiments having additional or fewer features or other embodiments incorporating different combinations of the stated features. The methods and systems according to this disclosure and claims can operate in a premise, cloud-based, or hybrid environment.

The features of the various embodiments may be stand alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

The invention claimed is:

1. An electronic communication system for contextual task creation, the electronic communication system comprising:
a data-collection engine configured to collect shared screen data, the data-collection engine is configured to electronically communicate with a virtual collaboration engine during a virtual meeting, and the shared screen data comprises user-provided content shared between users of the virtual collaboration engine during the virtual meeting;
one or more searchable databases in communication with the data-collection engine and configured to store the shared screen data during the virtual meeting; and
a search engine in communication with the one or more searchable databases and configured to (a) search the one or more searchable databases for a potential task during the virtual meeting, (b) confirm the potential task with a user to generate a confirmed task during the virtual meeting, and (c) store the confirmed task in a confirmed task database.

2. The electronic communication system of claim 1, wherein:
the data-collection engine is configured to collect the shared screen data by capturing an image of the shared screen data;
the shared screen data includes text; and
the shared screen data is analysed by a data analyser in communication with the search engine for the potential task by using one or more of (a) optical character recognition (OCR) techniques for converting an image of text into a machine-readable text format, and (b) natural language processing (NLP) techniques for text communications.

3. The electronic communication system of claim 1, wherein the potential task includes at least one of:
a deadline;
an assignee;
a recommended point of discussion based upon the shared screen data;
a recommended topic based upon the shared screen data;
a quote based upon the shared screen data;

advice based upon the shared screen data; and
a level of priority based upon sentiment analysis of the shared screen data.

4. The electronic communication system of claim 1, further comprising a graphical user interface configured to (a) display the shared screen data, and (b) display a task creation option.

5. The electronic communication system of claim 4, wherein the search engine is further configured to:
receive user input via the task creation option; and
the confirmed task is stored in the confirmed task database based upon the user input.

6. The electronic communication system of claim 4, wherein the data-collection engine is further configured to collect the shared screen data in response to at least one of:
the user selecting a portion of the graphical user interface that includes text for which task generation is desired; and
the user selecting the task creation option displayed on the graphical user interface.

7. The electronic communication system of claim 1, wherein the search engine is further configured to share, in real-time, the confirmed task with other users participating in the virtual meeting.

8. The electronic communication system of claim 1, further comprising the virtual collaboration engine configured to display the shared screen data during the virtual meeting.

9. The electronic communication system of claim 1, wherein the search engine is further configured to send the confirmed task to a task management engine whereby the confirmed task is shared with other participants of the virtual meeting.

10. The electronic communication system of claim 1, wherein:
the data-collection engine is further configured to collect shared chat data that includes text; and
the search engine is configured to (a) generate a potential chat-based task with the user based upon the shared chat data to generate a confirmed chat-based task, (b) confirm a scheduled reminder time with the user, and (c) send a reminder of the confirmed chat-based task to the user at the scheduled reminder time.

11. An electronic method for contextual task creation during screen sharing, the electronic method comprising the steps of:
using a data-collection engine, collecting shared screen data, the shared screen data includes user-provided content shared between users participating in a virtual meeting prior to the shared screen data being collected using the data-collection engine;
storing the shared screen data in one or more searchable databases in communication with the data-collection engine during the virtual meeting;
searching, utilizing a search engine in communication with the one or more searchable databases, the one or more searchable databases for a potential task during the virtual meeting;
confirming, utilizing the search engine, the potential task with a user to generate a confirmed task during the virtual meeting; and
storing, utilizing the search engine, the confirmed task in a confirmed task database.

12. The electronic method of claim 11, that further includes the steps of:
the data-collection engine collecting the shared screen data by capturing an image of the shared screen data, and the shared screen data includes text; and
a data analyser in communication with the search engine analyzing the shared screen data for the potential task by using one or more of (a) optical character recognition (OCR) techniques for converting an image of text into a machine-readable text format, and (b) natural language processing (NLP) techniques for text communications.

13. The electronic method of claim 11, wherein the potential task includes at least one of:
a deadline;
an assignee;
a quote based upon the shared screen data; and
a level of priority based upon sentiment analysis of the shared screen data.

14. The electronic method of claim 11, that further includes the step of a graphical user interface (a) displaying the shared screen data, and (b) displaying a task creation option.

15. The electronic method of claim 14, that further includes the step of the search engine:
receiving user input via the task creation option; and
storing the confirmed task in the confirmed task database based upon the user input.

16. The electronic method of claim 14, that further includes the step of the data-collection engine collecting the shared screen data in response to at least one of:
the user selecting a portion of the graphical user interface that includes text for which task generation is desired; and
the user selecting the task creation option displayed on the graphical user interface.

17. The electronic method of claim 11, that further includes the step of the search engine sharing, in real-time, the confirmed task with other users participating in the virtual meeting.

18. The electronic method of claim 11, that further includes the step of a virtual collaboration engine displaying the shared screen data during the virtual meeting.

19. The electronic method of claim 11, that further includes the step of the search engine sending the confirmed task to a task management engine.

20. An electronic method for contextual task creation during screen sharing, the electronic method comprising the steps of:
displaying, utilizing a virtual collaboration engine, a shared screen comprising shared screen data visible on at least a portion of the shared screen during a virtual meeting;
collecting, utilizing a data-collection engine, the shared screen data during the virtual meeting;
searching, utilizing a search engine, the shared screen data for a potential task;
displaying, utilizing the search engine, the potential task on a graphical user interface to a user during the virtual meeting;
receiving, utilizing the search engine, user input from the user based upon the potential task displayed on the graphical user interface during the virtual meeting;
confirming, utilizing the search engine, the potential task with the user via the user input to generate a confirmed task during the virtual meeting;
displaying, utilizing the search engine, an indicator on the graphical user interface that the task has been confirmed during the virtual meeting; and storing, utilizing the search engine, the confirmed task in a confirmed task database.

* * * * *